United States Patent [19]

Doi

[11] Patent Number: 4,791,587
[45] Date of Patent: Dec. 13, 1988

[54] SYSTEM FOR TRANSLATION OF SENTENCES FROM ONE LANGUAGE TO ANOTHER

[75] Inventor: Miwako Doi, Kawasaki, Japan

[73] Assignee: Kabushiki Kaisha Toshiba, Kawasaki, Japan

[21] Appl. No.: 810,261

[22] Filed: Dec. 18, 1985

[30] Foreign Application Priority Data

Dec. 25, 1984 [JP] Japan .................. 59-271808

[51] Int. Cl.⁴ .......................... G06F 15/38
[52] U.S. Cl. ................... 364/900; 364/419; 434/157
[58] Field of Search ... 364/200 MS File, 900 MS File, 364/419; 434/157

[56] References Cited

U.S. PATENT DOCUMENTS

| | | | |
|---|---|---|---|
| 4,193,119 | 3/1980 | Arase | 364/900 |
| 4,218,760 | 8/1980 | Levy | 364/900 |
| 4,393,462 | 7/1983 | Tanimoto et al. | 364/900 |
| 4,412,305 | 10/1983 | Yoshida | 364/900 |
| 4,417,319 | 11/1983 | Morimoto et al. | 434/157 |
| 4,460,973 | 7/1984 | Tanimoto | 364/900 |
| 4,475,171 | 10/1984 | Kanou | 364/419 |
| 4,502,128 | 2/1985 | Okajima et al. | 364/900 |
| 4,507,750 | 3/1985 | Frantz et al. | 364/900 |
| 4,509,137 | 4/1985 | Yoshida | 434/157 |
| 4,543,631 | 9/1985 | Kurosu et al. | 364/200 |
| 4,594,686 | 6/1986 | Yoshida | 364/419 |
| 4,597,055 | 6/1986 | Hashimoto et al. | 364/900 |
| 4,608,665 | 8/1986 | Yoshida | 364/900 |
| 4,623,985 | 11/1986 | Morimoto et al. | 364/419 |
| 4,633,435 | 12/1986 | Morimoto et al. | 364/900 |
| 4,635,199 | 1/1987 | Muraki | 364/900 |
| 4,636,977 | 1/1987 | Ikemoto et al. | 364/419 |
| 4,641,264 | 2/1987 | Nitta et al. | 364/900 |
| 4,644,492 | 2/1987 | Murata | 364/419 |

FOREIGN PATENT DOCUMENTS 0081784 6/1983 European Pat. Off. .

Primary Examiner—Gary V. Harkcom
Assistant Examiner—Randy W. Lacasse
Attorney, Agent, or Firm—Oblon, Fisher, Spivak, McClelland & Maier

[57] ABSTRACT

A machine translation system for translating a sentence of a first language to a sentence of a second language. The system has a dictionary, a display, an input unit, a selection data memory and a combination data memory. The translation possibilities for respective words and/or phrases of the original are obtained from the dictionary, ordered and are displayed by the display. The operator operates the input unit, thereby selecting one of the translation possibilities for each word or phrase. The selected possibilities for the words and phrases form a sentence of the second language, and are stored in the data memory in such a manner that they are associated with the equivalents of the first language. Further, the selected possibilities are stored in the combination data memory in such a way that any selected words or phrases that are semantically related are associated with the first language equivalent to one of the related words or phrases. The translation possibilities for any repeatedly used word or phrase of the first language are display in the priority order defined by the data stored in data memories.

9 Claims, 3 Drawing Sheets

FIG. 2

```
3a                                    3b
----------------                    ..................
---- On the way to the              ⋯ 家に帰る途中、チャールズ川〔を
house, we drove along the           どんどんドライブした・に沿ってドライ
Charles River. -----  E1            ブした〕。 ......... J2
                                    J1

--- He is driving along the         ⋯ 彼は川〔に沿ってドライブしてい
river.       E2                     る・をどんどんドライブしている〕。
                                           J3
                                           J4
```

FIG. 3

```
3a                          J11      3b
E11 ----------------                ..................
  The forecaster predicts  E12      〔予言者・天気予報官〕は、明日は雨で
  that it will rain tomorrow.        あろうと〔予言する・予報する・予想す
  ----------------                   る〕。 ............. J12
E21 ---------------- E22            J21 ..................
  The economist predicted the       〔経済学者・節約家〕は、景気は上向き
  market would look up.              であると〔予報した・予言した・予想し
  ----------------                   た〕。 ............. J22
  ----------------                  J31 ..................
  The forecaster predicted that     〔天気予報官・予言者〕は、今年の夏は
  this summer would be hot.         暑いだろうと〔予報した・予想した・予
E31                    E32          言した〕。 ......... J32
```

SYSTEM FOR TRANSLATION OF SENTENCES FROM ONE LANGUAGE TO ANOTHER

BACKGROUND OF THE INVENTION

The present invention relates to a machine translation system for translating a sentence in one language to a sentence in another language.

Machine translation systems have been developed in recent years to translate an English sentence to a Japanese sentence, or vise versa. They, however, cannot perform a completely automatic translation. They can do nothing but assist the human translators.

Machine translation uses a dictionary as a data base. More specifically, the words and phrases of the object language, which are equivalent to those of the original language are retrieved from this dictionary. The retrieved words and phrases are reordered in accordance with the grammatical rules of the object language.

A sentences of the original language may be ambiguous for the following reasons. First, some words belong to two or more parts of speech. Secondly, a word or a phrase may modify two or more other sentence elements. Thirdly, a word or a phrase may have two or more equivalents of the object language. Hence, it is beyond the ability of the system to translate a sentence of the original language to a sentence of the object language which is generally considered to be appropriate.

When a plurality of translation possibilities are retrieved from the dictionary for each word or phrase of the original sentence, the operator (i.e., the human translator) selects one of them which he or she thinks is the most appropriate. That is, the operator and the system cooperate to translate sentences in the original language to those in the object language. This method is, so to speak, "interactive automatic translation." The interactive automatic translation has a drawback. When the same word or the same phrase, which has various equivalents of the object language, is used in the original many times, the operator must repeat the same selection many times. Therefore, the efficiency of an interactive automatic translation is low. Further, in order to select the most appropriate of the translation possibilities retrieved from the dictionary, the operator needs to understand the other words or phrases of the original language which seem to be associated with the word or phrase being translated. It takes him or her a considerable time to understand such other words and phrases. This also reduces the efficiency of the interactive automatic translation.

SUMMARY OF THE INVENTION

It is an object of the present invention to provide a machine translation system for simplifying selection when a plurality of translation possibilities corresponding to the words and/or phrases of the original sentence are present, and achieving translation with high efficiency.

According to a machine translation system of the present invention, an input original sentence is processed to derive a translated sentence by retrieving data from a translation dictionary. When a plurality of translation possibilities are extracted from data stored in the dictionary, these possibilities are displayed on a screen. An operator selects an appropriate possibility, and automatic translation is made by using the selected possibility.

Selected translation possibilities and/or combinations of possibilities are stored as data corresponding to original words and/or phrases and/or combinations of the original words and/or phrases. When the same words and/or phrases or combinations thereof appear in original sentences, the selected and stored translation possibilities are displayed first.

According to the present invention, when translation processes includes "ambiguity", appropriate translated words and phrases from the original sentences can be easily selected. For this reason, translation is efficiently processed while "ambiguity" is minimized.

The translation possibilities and/or their combinations selected by the operator are stored as data corresponding to the words and/or phrases and/or combinations thereof of the original sentences. When the same words and/or phrases and/or combinations thereof repeatedly appear in original sentences for translation, the stored data is utilized to display the selected possibilities and/or their combinations first. The input operation is thus simplified to effectively perform translation and editing operations. Since the empirical data can be stored and effectively utilized, the work load of the operator can be greatly decreased.

BRIEF DESCRIPTION OF THE DRAWINGS

FIG. 2 is a front view of a display screen showing an example of original sentences and corresponding translated sentences in the system of FIG. 1;

FIG. 3 is a front view of a display screen showing another example of original and corresponding translated sentences so as to explain translation processing in the system of FIG. 1.

DETAILED DESCRIPTION OF THE PREFERRED EMBODIMENTS

Figure 1:
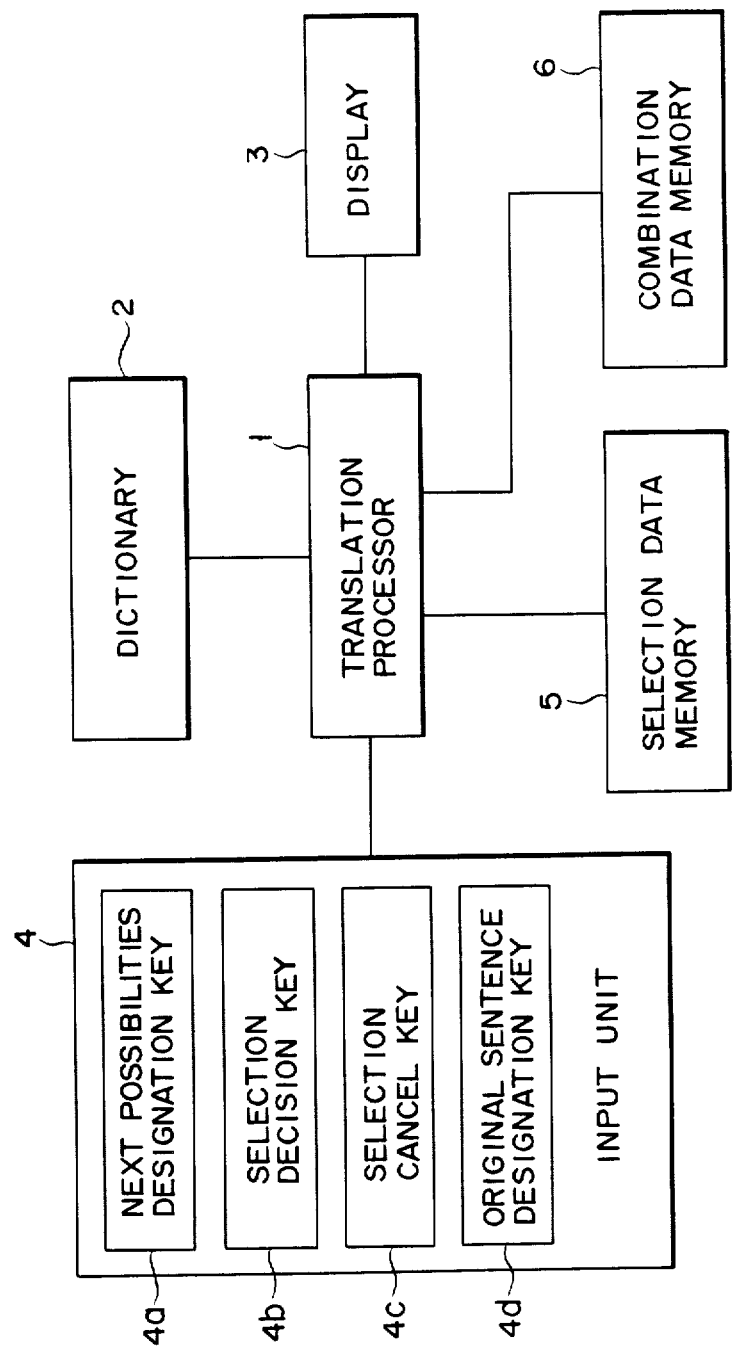
FIG. 1 is a block diagram showing a schematic configuration of a machine translation system according to an embodiment of the present invention.

FIG. 1 is a block diagram schematically showing a machine translation system according to the invention. This system is designed to translate English into Japanese. Nonetheless, the present invention is not limited to an English-Japanese translation. The system comprises a translation processor 1, a dictionary 2, a display 3, an input unit 4, a selection data memory 5 and a combination data memory 6.

The processor 1 translates English sentences into Japanese sentences, by retrieving necessary data from the dictionary 2. The dictionary 2 is a data base consisting of English words and phrases, index words, and Japanese words and phrases; it contains all Japanese equivalents to each English word or phrases.

More specifically, from the dictionary 2 the processor 1 extracts the Japanese equivalents to the words and phrases used in an original English sentence, then analyzes the structure of the English sentence in accordance with grammatical rules, and combines the Japanese equivalents in accordance with the grammatical analysis, thus translating an English sentence to a Japanese sentence.

As shown in FIG. 2, the display 3 has two display areas 3a and 3b. The first area 3a is used to display a given English sentence, and the second area is used to display the equivalent Japanese sentence provided by the processor 1. When two or more Japanese equivalents to an English word or phrase are retrieved from the dictionary 2, they are displayed in the second display area 3b. The operator selects the most equivalent, in such a manner as will be described later.

Let us assume that two English sentences, "On the way to the house, we drove along the Charles River" and "He is driving along the river" are input to the machine translation system. Then, these sentences are displayed in the first display area 3a of the display 3, as shown in FIG. 2. Simultaneously, the translation processor 1 translates these sentences to two Japanese sentences. The Japanese sentences are displayed in the second display area 3b of the display 3. The first Japanese sentence contains two equivalents J1 and J2 to the English phrase E1, "drove along," i.e., "wo don-don doraibu shita (continuously drove)" and "ni sotte doraibu shita (drove along ...)". Similarly, the second Japanese sentence contains two Japanese equivalents J3 and J4 to the English phrase E2, "is driving along.", i.e., "ni sotte doraibu shiteiru (be driving along ...)" and "wo don-don doraibu shiteiru (be continuously driving)". Whenever two or more translation possibilities of one English word or phrase are retrieved from the dictionary 2, a display attribute, such as an underline, highlighting or brinking, is given to the English word or phrase. In this embodiment, the display attribute is an underline.

The input unit 4 is operated to give an editing command for editing any Japanese sentence translated by the processor 1 from the English original and displayed the display 3. The unit 4 has a key 4a for designating the next translation possibility, a key 4b for selecting the designated translation possibility, a key 4c for cancelling the designation of any translation possibility, and a key 4d for designating one of the words or phrase in the English sentences.

The key 4a is used to designate one of lation possibilities of an original word and/or phrase which are stored in the dictionary 2 and displayed on the display 3. More specifically, when a plurality of translation possibilities are present and are simultaneously displayed on the screen as described above, the key 4a is operated by the operator to display a special display attribute (e.g., the underline) for distinguishing any one of the translation possibilities from other possibilities (See the translated phrase J2 in FIG. 2). The key 4a is operated to designate a new translation possibility (i.e, the next possibility) next to the translation possibility originally distinguished by the special display attribute. In this case, when the designated translation possibility is located on the last line of the translation possibilities, the next translation possibility is the one located on the first line. In the case of FIG. 2, the translation possibility J2 is underlined and designated as the possibility for the original phrase E1. When the key 4a is operated by the operator, the translation possibility J1 is designated (the underline disappears from the possibility J2, and then the possibility J1 is underlined).

When a plurality of translation possibilities are present, the translation possibilities can be selectively displayed. In this case, a special display attribute indicating the presence of other possibilities is used. When the key 4a is operated, the possibility next to the currently designated possibility is displayed on the display 3.

The key 4b is used to select one of the plurality of translation possibilities displayed on the display 3 as the optimal translation possibility in response to the command from the key 4a. More specifically, the key 4b is operated by the operator while one of the plurality of translation possibilities displayed on the display 3 is being designated. The currently designated translation possibility is thus selected. The key 4c is used to cancel selection of the designated translation possibility. When the key 4c is operated by the operator after the translation possibility has been selected, the state prior to the selection of the translation possibility is restored. The key 4d is used to identify the original word (phrase) corresponding to the displayed translation possibility. When the key 4d is operated by the operator, the original word (phrase) corresponding to the translation possibility is distinguished by the special display attribute. The underline display of the phrase E1 in FIG. 2 is an example of identification in response to operation of the key 4d. In this case, operation of the key 4d may be co-ordinated with designation of a translation possibility, thereby designating the original phrase corresponding to the specific translation possibility group.

Upon operation of the key 4a, the translation possibility next to the currently designated translation possibility is designated. Upon operation of the key 4b, the currently designated translation possibility is selected. Selection of the translation possibility changes the display 3 to show that the translation possibility has been selected. For this purpose, a special display attribute can be used. In order to show that the possibility has been selected, the same display mode used in the case where only one translation possibility is present can be set. In other words, only the selected translation possibility is displayed on the display 3. When the key 4c is operated upon selection of the translation possibility, the display screen prior to selection is restored.

The processor 1 sequentially selects appropriate translated words (phrases) corresponding to the words (phrases) constituting the original sentence in resposne to the translation editing commands entered in the unit 4, thereby creating the translated sentence corresponding to the original sentence. The processor 1 causes the display 3 to display the translated sentence and an output device (not shown) to print it out.

The memory 5 stores the selected translation possibilities associated with the corresponding original words (phrases).

The memory 6 stores combinations of translation possibilities sequentially selected and asociated with each other in relation to the corresponding combinations of original words (phrases).

The data is stored in the memories 5 and 6 under the control of the processor 1. The storage data is used as empirical knowledge in translation process (to be described later).

As translation process continues, when previously selected translation possibilities and combinations of selected translation possibilities reoccur in original sentences, the translation possibilities which have been selected most recently have priority over other translation possibilities and are displayed first.

The machine translation system having the configuration described above performs translation processing in the following manner.

The processor 1 for processing input original sentences analyzes the structure and form of the original sentences and sequentially processes words or phrases which constitute the original sentences by accessing the dictionary 2. When a plurality of translation possibilities corresponding to a given original word (phrase) are present, these posibilities are displayed on the display 3 to allow the operator to select an appropriate possibility. Preferably, the translation possibilities are simultaneously displayed. One of these translation possibilities is selectively designated with the special display attribute. Another preferable display mode is given such that only one translation possibility is displayed with a predetermined display attribute which indicates the presence of other translation attributes. When the operator operates the key 4b, the currently designated translation possibility is fetched as an appropriate word or phrase in the processor 1. However, the selection can be cancelled by operation of the key 4c.

When the designated translation possibility is decided by the operator to be inappropriate, the operator depresses the key 4a to supply a next possibility designation commandtto the processor 1 and the next translation possibility is designated. Upon repeated operation of the key 4a, a plurality of translation possibilities are sequentially designated. The operator operates the key 4b to select the appropriate translation possibility among the plurality of possibilities.

During selection of the translation possibilities, when the operator wishes to check the original words or phrases corresponding to the translation possibilities, he depresses the key 4d. In response to the command from the key 4d, the word (phrase) in the original sentence displayed on the display 3 is designated by a predetermined display attribute, e.g., underlined. The designated original words or phrases can then be distinguished from other original words or phrases (phrase E1 in FIG. 2). The relationship between the original sentence and the translated sentence can be distinguished as a reference for translation possibility selection.

The above operation is repeatedly performed for each original word (phrase). The selected, translated words are connected in accordance with the predetermined grammatical rules to produce a translated sentence. Easy selection of translation possibilities allows effective translation into natural sentences.

An identical word (phrase), generally an important word (phrase) is repeated often in the input original sentences. Based on this fact, the selected translation possibilities in association with the corresponding original words (phrases) are stored in the memory 5 and are used as empirical knowledge in translation process. By utilizing the stored information, when substantially the same word (phrase) as the stored information, e.g., a basic pattern of a word conjugated, inflected or declined, reoccurs in the original sentence, the processor 1 determines that the previously selected translation possibilities are appropriate. These possibilities are displayed first. This is because identical words (phrases) are generally translated to identical translation possibilities, and the selected possibilities have a high probability for reselection. Therefore, the selected possibilities are displayed first upon reoccurrence of identical original words (phrases).

Referring to FIG. 2, for example, the Japanese equivalent J2, ". . . ni sotte doraibu shita (drove along. . . )" is selected for the original phrase E1 "drove along", the selected phrase J2 is stored in the memory 5. When a phrase E2 "is driving along" appears in the original sentence, translation is automatically performed by using the stored data. (If a conjugative word or words are contained in the English phrase or sentence, the conjunction forms of the equivalent Japanese words, which correspond to the those of these English words, are automatically selected.) More specifically, a Japanese equivalent J3, ". . . ni sotte doraibu shiteiru (is driving along. . . )" is displayed with priority over the Japanese equivalent J4, ". . . wo don-don doraibu shiteiru (is continuously driving. . . )".

With the processing described above, the operator need not select the reoccurring word (phrase) from all the translation possibilities but need select only the translation possibility having priority. In this case, the processor 1 can select the translation possibility with priority and automatically process the translation using it. Therefore, the selection from a plurality of translation possibilities can be greatly simplified.

In the system of this embodiment, data as combinations of selected translation possibilities (translated words/phrases) is stored in the memory 6. The data stored in the memory 6 is, for example, data representing the relationship between a subject and a corresponding translation possibility in the form of a verb having different meanings and requiring different translated words for different subjects.

An example of a display mode of the display 3 which is different from that of FIG. 2 is illustated in FIG. 3. In the example of FIG. 3, a word E11 "forecaster" and a word E12 "predicts" in a main clause "The forecaster predicts" of the original sentence displayed in the area 3a have a plurality of translation possibilities. A Japanese equivalent J11, "tenki yohou kan (weatherman)" is selected as a translation possibility for the word E11 "forecaster". A Japanese equivalent J12, "yohousuru (forecast)" is selected as a translation possibility for the word E12 "predicts". Similarly, a plurality of translation possibilities are present in a word E21 "economist" and a word E22 "predicted" in a main clause of "The economist predicted". A Japanese equivalent J21, "keizaigakusha (a specialist in economics)" is selected as a translation possibility for the word E21 "economist". A Japanese equivalent J22, "yosou shita (foretell)" is selected as a translation possibility for the word E22 "predicted". The different translation possibilities J12 and J22 are selected for an identical word "predict" in accordance with different subjects. The translation possibilities J12 and J22 are stored as combined data with the subjects "forecaster" represented by the word E11 and "economist" represented by the word E21.

In translation process as described above, when the word "predict" appears in combination with the word "forecaster", the translation possibility "forecast" has a priority over the translation possibility "foretell" in accordance with the stored data in the memory 6.

In the case of the main clause "The forecaster predicted" of FIG. 3, a Japanese equivalent J32, "yohou shita (forecast)" has priority over other translation possibilities and is so displayed when in combination with a word E31 (the same as E11) "forecaster".

Figure 4:
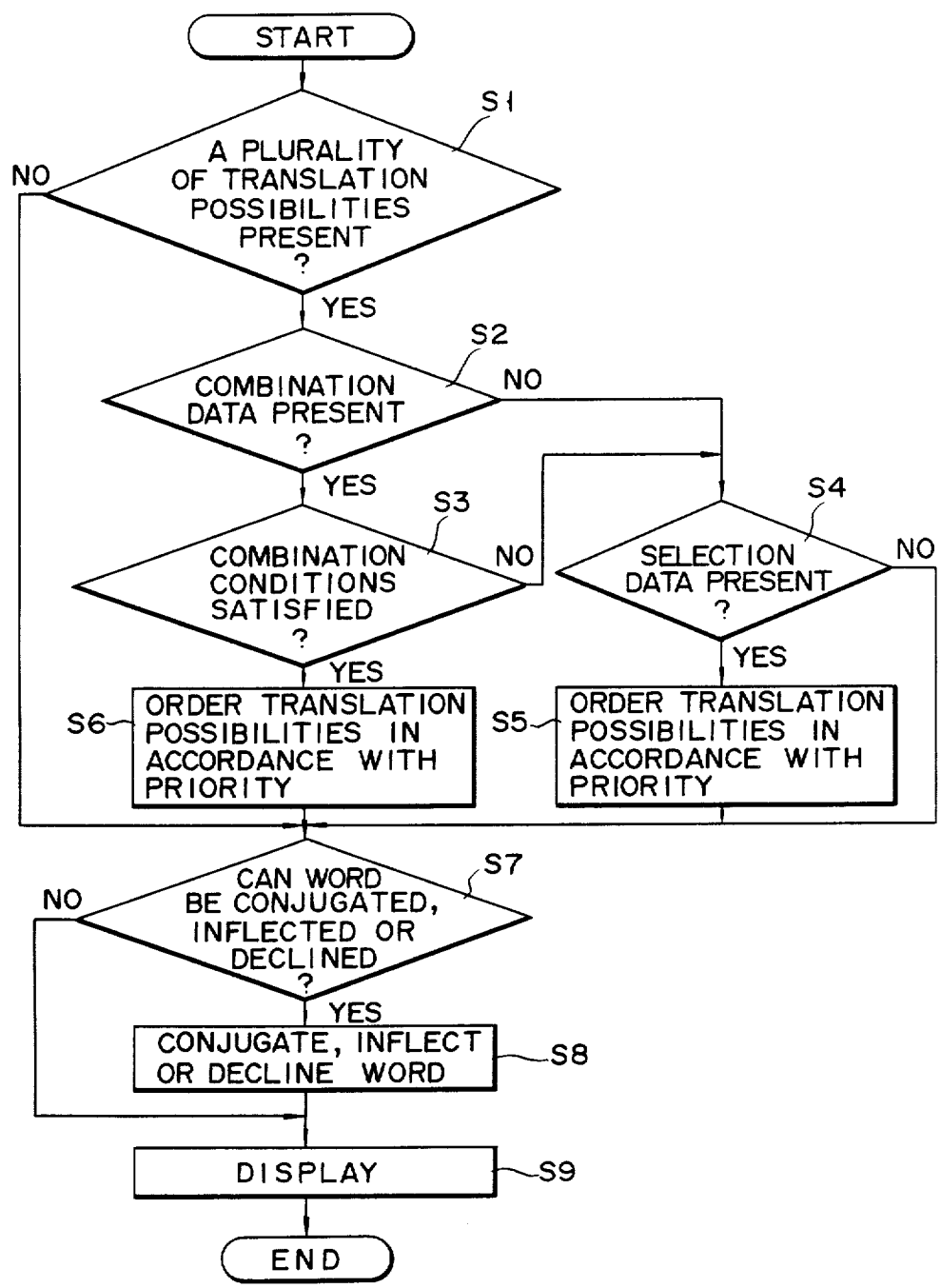
FIG. 4 is a flow chart showing main steps in translation processing in the system of FIG. 1.

A flow chart for controlling priority display of the translation possibility in the main system is shown in FIG. 4.

Processing shown in FIG. 4 is performed by the processor 1 to sequentially process the input original words (phrases) in units of phrases.

The processor 1 checks in step S1 whether or not a plurality of translation possibilities are present for a word (phrase) of interest. If NO in step S1, i.e., when only one translation possibility is present, the flow jumps to step S7. However, if YES in step S1, the processor 1 checks in step S2 whether or not combination data corresponding to the word (phrase) is stored in the memory 6. If NO in step S2, the flow advances to step S4. However, if YES in step S2, the flow advances to step S3. The processor 1 checks in step S3 whether or not a word (phrase) satisfying the combination conditions is present in the original sentence. If NO in step S3, i.e., when the processor 1 determines that the combination conditions are not established, the flow advances to step S4. The processor 1 checks in step S4 whether or not the previous selected data corresponding to the word (phrase) is stored in the memory 5. If NO in step S4, the flow advances to step S7. However, if YES in step S4, the flow advances to step S5. The translation possibilities are aligned in accordance with the priority order of the selected data, and the flow advances to step S7. However, if YES in step S3, the flow advances to step S6. The translation possibilities are aligned in accordance with the priority order of the stored combination data, and the flow advances to step S7. The processor 1 checks in step S7 whether or not a word can be conjugated, inflected or declined. If YES in step S7, the word is conjugated, inflected or declined in step S8, and the resultant word is displayed in step S9. However, if NO in step S7, the flow jumps to step S9, and the word is displayed in step S9. The highest priority word is underlined in the display in step S9.

For example, when an original word having a plurality of corresponding translation possibilities is a verb, the translation possibility in association with the subject has the highest priority. Therefore, the original word can be assigned different translation possibilities when in conjunction with different subjects.

According to the system of this embodiment as described above, an appropriate translated word (phrase) can be easily selected from the plurality of translation possibilities corresponding to the original word or phrase. In other words, appropriate translation possibilities can be sequentially determined between original and translated sentences which have different sentence structures while the original and translated words or phrases are displayed in one-to-one correspondence on the display 3. In this way, the selected translation possibilities are accumulated as empirical knowledge for translation processing. The stored data is used when the identical original word (phrase) reoccurs in original sentences. The selected translation possibility is displayed as the one with the highest priority, thereby simplifying the translation possibility designation operation and improving translation efficiency. Furthermore, translated word (phrase) combination data are also accumulated, and the translation possibilities are displayed in prioritized order in accordance with the combination data. Therefore, selection of a translation possibility associated with the type of subject can be simplified.

The present invention is not limited to the particular embodiment described above. The display format of the original and translated sentences, and the display formats for displaying the translation possibilities during translation processing and the original word (phrase) corresponding to the translation possibility can be determined in accordance with the given system specifications. The special display attribute for distinguishing a predetermined portion of the original or translated sentence from other portions can be an underline display, inverted image display, highlight display, blinking display or color display. These special display attributes can be used in combination, or used in accordance with the identification items. Various changes and modifications may therefore be made within the spirit and scope of the invention.

What is claimed is:

1. A machine translation system comprising:
    display means for displaying an input original sentence and a translated sentence corresponding to the input original sentence;
    a dictionary for deriving at least one translation possibility of a language of the translated sentence with respect to data of at least one word or phrase of a language of the original sentence;
    an input means for causing an operator to input control data;
    selection data storage means for storing translation possibility selection data; and
    translation processing means having first means for obtaining the translation possibility for every word or phrase in the original sentence by accessing said dictionary, second means for aligning the translation possibilities of each word or phrase which are obtained by said first means, distinguishing a plurality of translation possibilities of an identical word or phrase in the original sentence from other translation possibilities, and displaying on said display means the translation possibility of the word or phrase which is obtained by said first means, third means for selecting, in response to an input at said input means, one of said plurality of translation possibilities of the identical word or phrase which are displayed by said second means on said display means, fourth means for causing said second means to process as a sole translation possibility for a corresponding word or phrase the translation possibility selected by said third means, fifth means for causing said selection data storage means to store the translation possibility selected by said third means substantially in association with a corresponding word or phrase in the original sentence, and sixth means for controlling a display priority order of said plurality of translation possibilities of an identical word or phrase with reference to the data stored in said selection data storage means when said plurality of translation possibilities of the identical word or phrase are displayed on said display means.

2. A system according to claim 1, wherein said second means in said translation processing means comprises means for ordering the plurality of translation possibilities of the identical word or phrase in the original sentence and causing said display means to display the ordered plurality of translation possibilities, and for designating one of said plurality of translation possibilities, and said third means comprises means for sequentially changing the designated translation possibility in accordance with input data from said input means and for selecting the designated translation possibility in accordance with the input data from said input means.

3. A system according to claim 1, wherein said second means in said translation processing means comprises means for displaying with a specific display attribute said one of said plurality of translation possibilities of the identical word or phrase in the original sentence so as to distinguish said one from translation possibilities of other words or phrase, and said third means comprising means for sequentially changing said one of said plurality of translation possibilities of the identical word or phrase in accordance with input data from said input means and for selecting the display translation possibility in accordance with the input data from said input means.

4. A system according to claim 1, wherein said translation processing means further includes fifth means for cancelling the designated translation possibility selected by said third means in accordance with input data from said input means.

5. A machine translation system comprising:
   display means for displaying an input original sentence and a translated sentence corresponding to the input original sentence;
   a dictionary for deriving at least one translation possibility of a language of the translated sentence with respect to data of at least one word or phrase of a language of the original sentence;
   an input means for causing an operator to input control data;
   combination data storage means for storing translation possibility combination data; and
   translation processing means having first means for obtaining the translation possibility for every word or phrase in the original sentence by accessing said dictionary, second means for aligning the translation possibilities of each word or phrase which are obtained by said first means, distinguishing a plurality of translation possibilities of an identical word or phrase in the original sentence from other translation possibilities, and displaying on said display means the translation possibility of the word or phrase which is obtained by said first means, third means for selecting, in response to an input at said input means, one of said plurality of translation possibilities of the identical word or phrase which are displayed by said second means on said display means, fourth means for causing said second means to process as a sole translation possibility for a corresponding word or phrase the translation possibility selected by said third means, fifth means for causing said combination data storage means to store the translation possibility selected by said third means substantially in association with a combination of a corresponding word or phrase in the original sentence and an associated word or phrase in the original sentence, and sixth means for controlling a display priority order of said plurality of translation possibilities of an identical word or phrase substantially with reference to the data stored in said combination data storage means and the original sentence when said plurality of translation possibilities of the identical word or phrase are displayed on said display means.

6. A system according to claim 5, wherein said second means in said translation processing means comprises means for ordering the plurality of translation possibilities of the identical word or phrase in the original sentence and causing said display means to display the ordered plurality of translation possibilities, and for designating one of said plurality of translation possibilities, and said third means comprises means for sequentially changing the designated translation possibility in accordance with input data from said input means and for selecting the designated translation possibility in accordance with the input data from said input means.

7. A system according to claim 5, wherein said second means in said translation processing means comprises means for displaying with a specific display attribute said one of said plurality of translation possibilities of the identical word or phrase in the original sentence so as to distinguish said one from translation possibilities of other words or phrases, and said third means comprises means for sequentially changing said one of said plurality of translation possibilities of the identical word or phrase in accordance with input data from said input means and for selecting the designated translation possibility in accordance with the input data from said input means.

8. A system according to claim 5, wherein said translation processing means further includes fifth means for cancelling the designated translation possibility selected by said third means in accordance with input data from said input means.

9. A machine translation system comprising:
   display means for displaying an input original sentence and a translating sentence corresponding to the input original sentence;
   a dictionary for deriving at least one translation possibility of a language of the translated sentence with respect to data of at least one word or phrase of a language of the original sentence;
   an input means for causing an operator to input control data;
   combination data storage means for storing translation possibility combination data;
   selection data storage means for storing translation possibility selection data; and
   translation processing means having first means for obtaining the translation possibility for every word or phrase in the original sentence by accessing said dictionary, second means for aligning the translation possibilities of each word or phase which are obtained by said first means, distinguishing a plurality of translation possibilities of an identical word or phrase in the original sentence from other translation possibilities, and displaying on said display means the translation possibility of the word or phrase which is obtained by first means, third means for selecting, in response to an input at said input means, one of said plurality of translation possibilities of the identical word or phrase which are displayed by said second means on said display means, fourth means for causing said second means to process as a sole translation possibility for a corresponding word or phrase the translation possibility selected by said third means, fifth means for causing said combination data storage means to store the translation possibility selected by said third means substantially in association with a combination of a corresponding word or phrase in the original sentence and an associated word or phrase in the original sentence, sixth means for controlling a display priority order of said plurality of translation possibilities of an identical word or phrase substantially with reference to the data stored in said combination data storage means and the original sentence when said plurality of translation possibilities of the identical word or phrase are displayed on said display means, seventh means for causing said selection data storage means to store the translation possibility selected by said third means substantially in association with a corresponding word or phrase in the original sentence, and eighth means for controlling a display priority order of said plurality of translation possibilities of an identical word or phrase with reference to the data stored in said selection data storage means when said plurality of translation possibilities of the identical word or phrase are displayed on said display means, priority order control of said sixth means having a priority over that of said eighth means.

* * * * *